United States Patent
Wai et al.

(10) Patent No.: US 11,964,633 B2
(45) Date of Patent: Apr. 23, 2024

(54) VEHICLE DEFOGGING SYSTEMS

(71) Applicant: Toyota Motor Engineering & Manufacturing North America, Inc, Plano, TX (US)

(72) Inventors: Nathan Wai, Ypsilanti, MI (US);
Elliott Y. Vega, Ypsilanti, MI (US);
Erik A. Wippler, Canton, MI (US);
Youngsuk Yoon, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 975 days.

(21) Appl. No.: 16/909,421

(22) Filed: Jun. 23, 2020

(65) Prior Publication Data
US 2021/0394717 A1    Dec. 23, 2021

(51) Int. Cl.
*B60S 1/02*     (2006.01)
*B60H 1/00*     (2006.01)
*H05B 3/84*     (2006.01)

(52) U.S. Cl.
CPC .......... *B60S 1/026* (2013.01); *B60H 1/00792* (2013.01); *H05B 3/84* (2013.01)

(58) Field of Classification Search
CPC ........ B60S 1/026; B60H 1/00792; H05B 3/84
USPC ........................................................ 454/121
See application file for complete search history.

(56) References Cited

U.S. PATENT DOCUMENTS

| | | | | |
|---|---|---|---|---|
| 6,100,500 A * | 8/2000 | Jefferson, Jr. | ............ | H05B 3/84 52/171.2 |
| 7,798,658 B2 * | 9/2010 | Sharma | ................. | B60R 1/0602 15/313 |
| 8,629,375 B2 * | 1/2014 | Pinto, IV | ................. | H05B 3/84 239/128 |
| 8,745,998 B2 * | 6/2014 | Delorme | ................. | B60S 1/026 165/230 |
| 10,172,185 B2 * | 1/2019 | Dudar | ................. | H05B 1/0236 |
| 11,548,482 B2 * | 1/2023 | Ebey | ..................... | B60R 1/0602 |

(Continued)

FOREIGN PATENT DOCUMENTS

CN    204399116 U    6/2015
CN    205661372 U    10/2016

(Continued)

OTHER PUBLICATIONS

Activating and deactivating automatic starting of the heated rear window and door mirrors (https://www.volvocars.com/uk/support/manuals/v90/2019-early/climate/climate-controls-for-windows-and-mirrors/activating-and-deactivating-automatic-starting-of-the-heated-rear-window-and-door-mirrors Accessed: Jul. 30, 2018.

*Primary Examiner* — Avinash A Savani
*Assistant Examiner* — Dana K Tighe
(74) *Attorney, Agent, or Firm* — Dinsmore & Shohl LLP

(57) ABSTRACT

In one embodiment, a vehicle defogging system may include a side mirror defogger, one or more other vehicle defoggers, one or more sensors, and a control unit. The side mirror defogger is independently controllable from the one or more other vehicle defoggers. The one or more sensors are configured to output a signal indicative a substance on a side mirror of a vehicle. The control unit is configured to detect the substance on the side mirror based on the signal of the one or more sensors, and activate the side mirror defogger in response to detecting the substance on the side mirror.

10 Claims, 4 Drawing Sheets

(56) References Cited

U.S. PATENT DOCUMENTS

| | | | | |
|---|---|---|---|---|
| 2011/0111684 A1* | 5/2011 | Wang | ........................ | B60S 1/08 |
| | | | | 454/121 |
| 2014/0200742 A1* | 7/2014 | Mauti, Jr. | ........... | F02N 11/0807 |
| | | | | 701/2 |
| 2019/0077316 A1 | 3/2019 | Salter et al. | | |

FOREIGN PATENT DOCUMENTS

| | | |
|---|---|---|
| CN | 107323348 A | 11/2017 |
| EP | 1413172 B1 | 3/2009 |
| JP | 10157577 A | 6/1998 |
| KR | 970020709 A | 5/1997 |
| WO | 2002090149 A1 | 11/2002 |

* cited by examiner

VEHICLE DEFOGGING SYSTEMS

TECHNICAL FIELD

The present specification generally relates to vehicle defogging systems and, more specifically, vehicle defogging systems including independent actuated side mirror defoggers.

BACKGROUND

Currently, side mirror defogging technology is tied to other vehicle elements. For instance, side mirror defoggers may be tied to a rear windshield defogger. Accordingly, if a user wishes to defog the side mirrors, they must activate the rear windshield defogger regardless of whether or not there is an actual need to defog the rear windshield. This may lead to inefficient power draws from the vehicle battery.

SUMMARY

In one embodiment, a vehicle defogging system may include a side mirror defogger, one or more other vehicle defoggers, one or more sensors, and a control unit. The side mirror defogger is independently controllable from the one or more other vehicle defoggers. The one or more sensors are configured to output a signal indicative a substance on a side mirror of a vehicle. The control unit is configured to detect the substance on the side mirror based on the signal of the one or more sensors, and activate the side mirror defogger in response to detecting the substance on the side mirror.

In another embodiment, vehicle defogging system may include a side mirror defogger, one or more other vehicle defoggers, network interface hardware, and a control unit. The side mirror defogger is independently controllable from the one or more other vehicle defoggers. The control unit is communicatively coupled to the side mirror defogger and the network interface hardware. The control unit is configured to retrieve weather data with the network interface hardware from one or more data servers, determine a likelihood of an accumulation of a substance on a side mirror of a vehicle based on the weather data, and activate the side mirror defogger automatically upon determination that there is a likelihood of substance accumulation on the side mirror of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to vehicle defogging systems that include side mirror defoggers that are independently operable from other vehicle defoggers (e.g., windshield defoggers, rear window defoggers, or the like) based on data made available through sensors and/or through a network (e.g., a cloud network). By operating the side mirror defoggers independently of other vehicle defoggers, energy savings may be achieved by reducing energy draws from vehicle batteries, which may be particularly important to electric and/or hybrid vehicles. Traditionally, side mirror defoggers are tied to operation of the rear window defogger. Rear window defoggers draw heavily on vehicle energy stores (e.g., 3+ amps) when running. Accordingly, it may be advantageous to operate the side mirror defoggers independently of the rear window defogger to achieve increased energy savings and improve overall vehicle efficiency.

As used herein, the term "defogger" is synonymous with the term "defroster" or "demister" which refers to any vehicle system which operates to warm glass and/or other vehicle surfaces to remove condensation, frost, ice, and/or snow. For example, defoggers may include blowers that blow warm and/or dehumidified air toward the glass of the vehicle to warm the glass. In another example, defoggers may include one or more resistive heating elements disposed on a surface of the glass or embedded within the glass, the resistive heating elements physically warming the surface of the glass when actuated. For example, resistive heating elements may be coupled to and/or positioned proximately to the glass and electrically coupled to a battery of the vehicle such that current traveling through the resistive heating element causes the resistive heating element to heat up, thereby causing the glass to warm.

Figure 1:
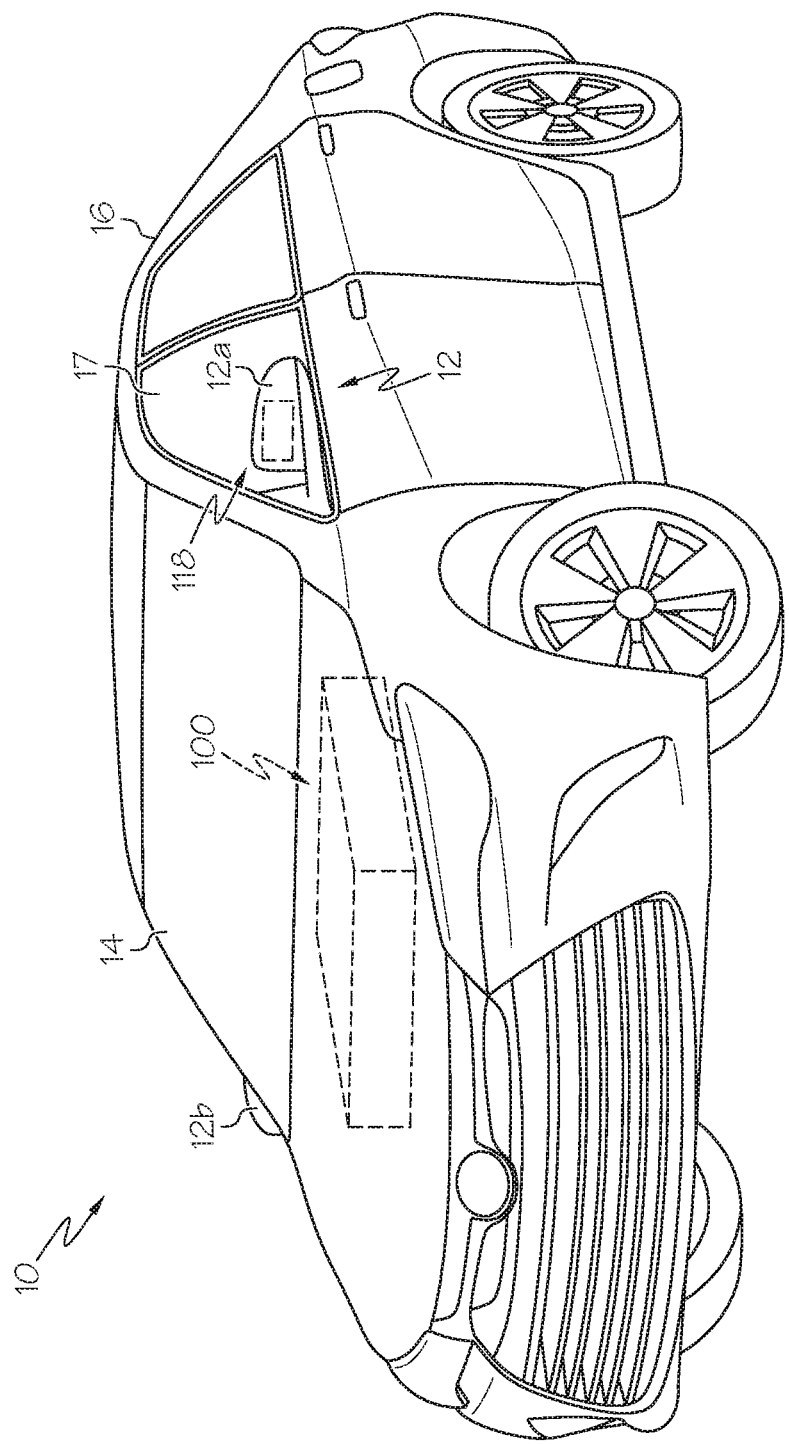
FIG. 1 depicts a vehicle having a vehicle defogging system according to one or more embodiments shown and described herein.

Referring now to FIG. 1 a vehicle 10 including side mirrors 12 is generally depicted. Vehicles according to the present disclosure may include any airborne, terrestrial, or aquatic vehicle and may include electric, hybrid, and/or gas-powered vehicles. Additionally, the vehicles according to the present disclosure may be driven autonomously, non-autonomously, and/or partially autonomously. The vehicle 10 includes a vehicle defogging system 100, schematically illustrated, that is configured to defog/defrost various surfaces of the vehicle 10 such as, for example, the front windshield 14, the rear windshield 16, the side windows 17, and the side mirrors 12.

The side mirrors 12 may include a first side mirror 12a coupled to the left side of the vehicle 10 and a second side mirror 12b coupled to the right side of the vehicle 10. Each side mirror 12a, 12b may include a side mirror defogger 118 (only illustrated on side mirror 12a) as part of the vehicle defogging system 100 that is configured to heat the side mirror 12 to remove condensation, frost, accumulated snow, or the like. As will be described in greater detail below, the side mirror defoggers are independently operable from other vehicle defoggers to allow to targeted defrosting/defogging of the side mirrors 12.

Figure 2:
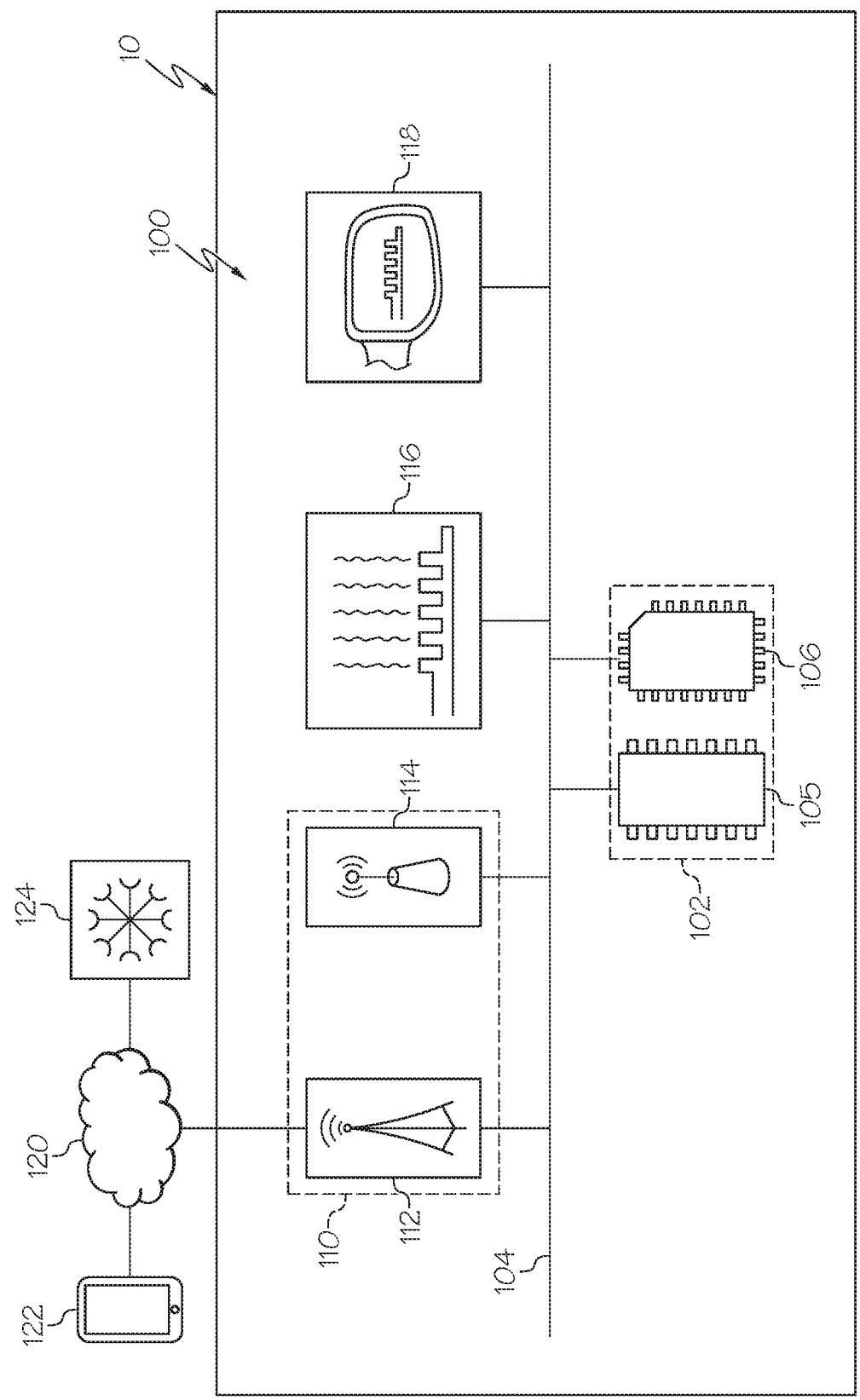
FIG. 2 schematically depicts a vehicle defogging system according to one or more embodiments shown and described herein.

FIG. 2 schematically illustrates the vehicle defogging system 100 including a plurality of modules. It is noted that while a specific number of modules are depicted, greater or fewer number of modules may be included without departing from the scope of the present disclosure. The vehicle defogging system 100 generally includes a communication path 104, a control unit 102, one or more sensors 110, a side mirror defogger 118 for defogging each side mirror 12, and one or more other vehicle defoggers 116 (e.g. front windshield 14 defogger, rear windshield 16 defogger, other window defoggers, or the like). In some embodiments, one or more sensors 110 may include any type of substance sensor 114, described in more detail below, configured to output a signal indicative of a presence of a substance on the side mirror 12 of the vehicle 10 and/or network interface hardware 112 to provide information regarding current weather data. That is, control unit 102 may retrieve current weather data (e.g., temperature, humidity, pressure, precipitation, dew point, or the like) with the network interface hardware 112 to determine the current weather in an environment of the vehicle 10.

As described above, the vehicle defogging system 100 includes a communication path 104 that provides data interconnectivity between various modules disposed within the vehicle defogging system 100. Specifically, each of the modules can operate as a node that may send and/or receive data. In some embodiments, the communication path 104 includes a conductive material that permits the transmission of electrical data signals to processors, memories, sensors, and actuators throughout the vehicle defogging system 100. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The control unit 102 may be any device configured to control operations of the various modules of the vehicle defogging system 100. In particular, the control unit 102 includes one or more processors 105 communicatively coupled with one or more memory modules 106 over the communication path 104. The one or more processors 105 may include any device capable of executing machine-readable instructions stored on a non-transitory computer-readable medium. Accordingly, each processor 105 may include a controller, an integrated circuit, a microchip, a computer, and/or any other computing device.

The one or more memory modules 106 are communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle defogging system 100, external to the vehicle defogging system 100 and/or external to the vehicle 10. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor 105, assembly language, object-oriented programming (OOP), scripting languages, microcode, or the like, that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as preprogrammed hardware elements, and/or as a combination of hardware and software components. As will be described herein, logic as implemented by the control unit 102 allows the vehicle defogging system 100 to operate the side mirror defoggers 118 independently of other vehicle defoggers 116 to remove any accumulated substance from the side mirror defoggers 118.

As noted above, the vehicle defogging system 100 further includes one or more sensors 110 communicatively coupled to the control unit 102 over the communication path 104. The one or more sensors 110 are configured to output a signal indicative of a substance on a side mirror 12 of the vehicle 10. As used herein, the term "substance" may refer to any condensation, fog, frost, ice, snow, or the like. The one or more sensors 110 may include substance sensors 114 such as optical sensors (e.g., cameras, laser scanners, and IR scanners, light sensors), temperature sensors, pressure sensors, humidity sensors, or any combination thereof that output a signal(s) indicative of one or more environmental characteristics that would allow the system to determine that a substance has, likely has, and/or will likely form on a side mirror 12 of the vehicle 10.

For example, optical sensors may be used to optically identify a substance has formed on the side mirror 12. In some embodiments, the control unit 102 may be operable to perform object recognition to identify the substance as fog, snow, ice, mud, or the like. To differentiate between an instance where the side mirror defogger 118 should be activated versus an instance where the side mirror defogger 118 should not be activated. In some embodiments, temperature sensors, pressure sensors, and/or humidity sensors may be used by the control unit 102 to confirm that the substance detected by an optical sensor is one of fog, frost, or snow. For example, where the temperature of the environment of the vehicle 10 is below a predetermined temperature (e.g., less than about 50° C., less than about 40° C., less than 32° C.) the vehicle 10 may determine that a substance has or will likely has formed on the side mirror 12(s) 12 of the vehicle 10. In another example, humidity above a predetermined threshold (e.g., above 50%, above 60%, above, 80%, above 90%), may allow the control unit 102 to determine that a substance (e.g., fog) has or likely will accumulate on the side mirror 12 of the vehicle 10

In some embodiments, the one or more sensors 110 may, in addition to and/or in lieu of substance sensors 114, include network interface hardware 112 for retrieving weather information. The network interface hardware 112 can be communicatively coupled to the communication path 104 and can be any device capable of transmitting and/or receiving data via the network 120. Accordingly, the network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware, and/or any wired or wireless hardware for communicating with other networks and/or devices. In one embodiment, network interface hardware 112 includes hardware configured to operate in accordance with the Bluetooth wireless communication protocol. In another embodiment, network interface hardware 112 116 may include a Bluetooth send/receive module for sending and receiving Bluetooth communications to/from the one or more mobile devices 122.

As described above, the vehicle defogging system 100 may communicate, through the network interface hardware 112, with a network 120 to communicatively couple the vehicle defogging system 100 data sources (e.g., one or more mobile devices 122 and/or one or more servers storing weather data 124). In one embodiment, the network 120 is a personal area network that utilizes Bluetooth technology to communicatively couple the vehicle defogging system 100 and the one or more mobile devices 122. In other embodiments, the network 120 may include one or more computer networks (e.g., a personal area network, a local area network, or a wide area network), cellular networks, satellite networks and/or a global positioning system and combinations thereof. Accordingly, the vehicle defogging system 100 can be communicatively coupled to the network 120 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In embodiments, the control unit 102 may communicate with a mobile device 122 weather application and/or a one or more servers storing weather data 124 to retrieve current weather information. The weather information may include, but is not limited to, precipitation, temperature, humidity, or the like. In some embodiments, the vehicle defogging system 100 may include a GPS unit to allow for determination of the location of the vehicle 10 such that weather data applicable to the current location of the vehicle 10 may be retrieved. In some embodiments, the vehicle defogging system 100 may retrieve weather data using the network interface hardware 112 to determine whether a fog, ice, snow, or the like is likely to have formed or will form on the side mirror 12. In response, to determining that a substance is likely to have formed and/or will form on the side mirror 12, the side mirror defogger 118 may be activated to clear the substance from the side mirror 12. In some embodiments, in response to determining there is a likelihood a substance will form on the side mirror 12, the side mirror defogger 118 may be pre-emptively activated to warm the side mirror 12 and prevent formation of a substance on the side mirror 12.

In some embodiments, in response to detecting a substance formed on the side mirror 12 of the vehicle 10 with the one or more substance sensors 114, the control unit 102 may retrieve weather data the one or more data sources with the network interface hardware 112 to confirm that the substance is likely fog, ice, or snow. In some embodiments, in response to weather data received over the network interface hardware 112, the control unit 102 may execute logic to monitor the side mirror 12 with the one or more substance sensors 114 (e.g., where the one or more substance sensors 114 include an optical sensor) the side mirrors 12 for formation of a substance on the side mirror 12.

Figure 3:
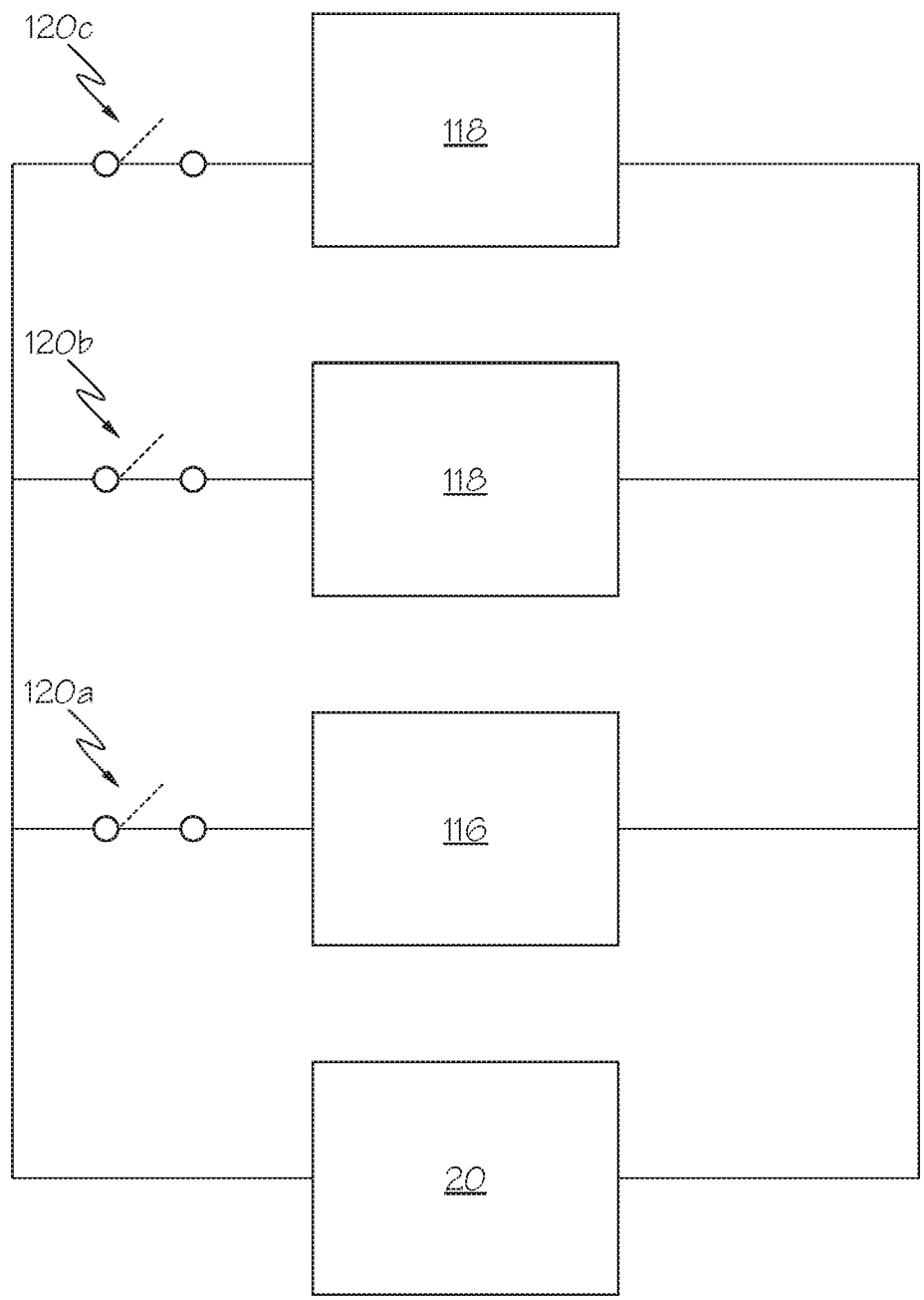
FIG. 3 schematically depicts an electrical diagram of a vehicle defogging system according to one or more embodiments shown and described herein.

Still referring FIG. 2, the side mirror defogger 118 and the other vehicle defoggers 116 are communicatively coupled to the control unit 102 over the communication path 104. Each of the side mirror defogger 118 and other vehicle defoggers 116 may include one or more heating elements configured to remove a substance from a surface of a vehicle 10. For example, and as noted above, defoggers may include blowers that blow warm and/or dehumidified air toward the glass of the vehicle 10 to warm the glass and/or a resistive heating element(s) that physically warms the surface of the glass. For example, resistive heating elements may be coupled to and/or positioned proximately to the glass and electrically coupled to a battery of the vehicle 10 such that current traveling through the resistive heating element causes the resistive heating element to heat up, thereby causing the glass to warm. The control unit 102 may selectively operate the side mirror defogger 118 independently from the other vehicle defoggers 116. For example, the side mirror defogger 118 may be operated independently of any front windshield defogger, rear windshield defogger, or the like of the vehicle 10. Independent operation of vehicle defoggers may allow for increased energy savings by allowing activation of only a particular defogger when needed instead of linking operation of one defogger with another. In some embodiments, each side mirror defogger 118 may be independently operated from the other side mirror defogger 118, thereby further increasing energy savings. For example, and not as a limitation, FIG. 3 illustrates a schematic electrical diagram of the one or more other vehicle defoggers and the side mirror defoggers 118 electrically coupled to a battery 20 in parallel. Each of the one or more vehicle defoggers 116 and the side mirror defoggers 118 may be electrically coupled to the battery 20 through a switch 120a, 120b, 120c. Each switch may be independently moved, by the control unit 104, between a closed and open position by the control unit 104 allow operation of the desired defogger. Accordingly, independent operation of the side mirror defoggers 118 and the one or more other vehicle defoggers 116 may be achieved.

Figure 4:
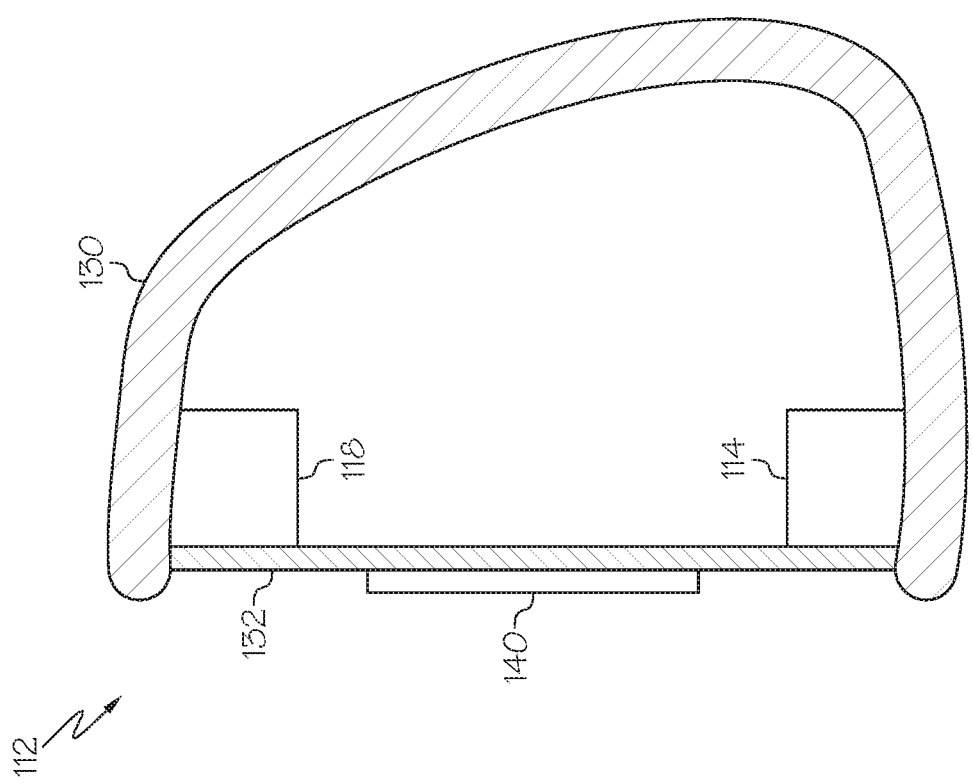
FIG. 4 schematically depicts a side mirror of a vehicle according to one or more embodiments shown and described herein

Referring now to FIG. 4, a cross-section of a side mirror 12 is schematically depicted. The side mirror 12 generally includes a housing 130 and a mirror 132 oriented to show areas behind and/or to the side of the vehicle 10. The one or more sensors 110 may be mounted to the side mirror 12 of the vehicle 10 for example, one or more substance sensors 114 may be mounted to and/or behind the mirror 132. In some embodiments, one or more sensors 110 may be mounted to a periphery of the mirror 132 on an exterior facing side of the mirror 132 and/or to the housing 130. The side mirror defogger 118 may be positioned within the housing to 130 to warm the mirror 132.

In embodiments, the mirror 132 may be any type of mirror 132 including a plane mirror, a convex mirror, or the like. In some embodiments, the glass of the mirror 132 may be a two-way mirror. Using a two-way mirror may allow the one or more sensors 110 to be positioned behind the mirror 132 in the housing 130. For example, wherein the one or more sensors 110 include a substance sensor 114 such as a camera or light sensor, the substance sensor 114 may obtain optical data through the mirror 132, to detect formation of substances on the mirror 132. In some embodiments, a window may instead be formed within the mirror 132 to allow the substance sensor 114 to obtain optical data through the mirror 132.

During operation, and with reference to FIGS. 2 and 3, the control unit 102 is operable to detect a substance 140 for on the side mirror 12 (in particular the mirror 132 or the side mirror) based on the signal of the one or more sensors 110. As noted above, detection of the substance may be based on the physical present of the substance 140, temperature, humidity, pressure, and/or weather data from a remote data source, or the like. As one example, where the one or more sensors 110 include one or more image sensors, one or more infrared sensors, or the like, the control unit 102 may activate the side mirror defogger 118 in response to detecting the substance 140. As noted herein, activation of the side mirror defogger(s) 118 may be independent of the other vehicle defoggers 116.

In some embodiments, the control unit 102 may retrieve current weather information from one or more data sources with the network interface hardware 112 in response to detection of the substance 140 on the side mirror 12 of the vehicle 10 to confirm that the substance is one or fog, frost, or snow. In response to the confirmation, the control unit 102 may automatically activate the side mirror defogger 118 to remove the substance 140.

In some embodiments, the control unit 102 may execute logic to learn typical vehicle start times. For example, the control unit 102 may detect when a vehicle 10 is started (e.g., by detection ignition activation, detecting a key within the vehicle 10, or the like.) and record the start time of the vehicle 10. In this way, the control unit 102 may determine a predetermined start time of the vehicle 10 or an operator may set a predetermined start time. Based on the predetermined start time, the control unit 102 may be operable to preemptively activate the side mirror defogger 118 based on the predetermined start time and a determination of a likelihood of an accumulation of a substance on the side mirror 12 of the vehicle 10.

As noted above, in yet further embodiments, the control unit 102 may be operable to retrieve one or more future environmental characteristics with the network interface hardware 112. Based on the one or more future environmental characteristics, the control unit 102 may be operable to preemptively activate the side mirror defogger 118. For example, where is it determined that it will likely snow, or frost within a predetermined time period in the future, the control unit 102 may actuate the side mirror defogger 118 to preemptively ensure the snow and/or frost does not form on the side mirror 12.

It should now be understood that embodiments of the present disclosure are directed to vehicle defogging systems that include side mirror defoggers that are independently operable from other vehicle defoggers (e.g., windshield defoggers, rear window defoggers, or the like.). By operating the side mirror defoggers independently of other vehicle defoggers, energy savings may be achieved by reducing energy draws from vehicle batteries, which may be particularly important to electric and/or hybrid vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle defogging system, comprising:
   a side mirror defogger;
   one or more other vehicle defoggers; wherein the side mirror defogger is independently controllable from the one or more other vehicle defoggers;
   one or more sensors configured to output a signal indicative a substance on a side mirror of a vehicle; and
   a control unit configured to:
   detect the substance on the side mirror based on the signal of the one or more sensors;
   retrieve current weather data from one or more data sources in response to detection of the substance;
   confirm, based on the current weather data, that the substance is one of fog, frost, or snow; and
   activate the side mirror defogger in response to the confirming that the substance is one of fog, frost, or snow.

2. The vehicle defogging system of claim 1, wherein the side mirror defogger comprises one or more heating elements positioned and configured to heat the side mirror of the vehicle.

3. The vehicle defogging system claim 1, wherein the one or more sensors comprise at least one of an image sensor or an infrared sensor.

4. The vehicle defogging system of claim 1, wherein signals from the one or more sensors indicative of the substance on the side mirror of the vehicle includes a temperature below a predetermined threshold, a physical presence of the substance on the side mirror of the vehicle, humidity above a predetermined threshold, or any combination thereof.

5. The vehicle defogging system of claim 1, wherein one or more of the one or sensors are mounted to the side mirror of the vehicle.

6. A vehicle defogging system, comprising:
   a side mirror defogger;
   one or more sensors configured to output a signal indicative of a substance on a side mirror of a vehicle;
   network interface hardware; and
   a control unit configured to:
   detect the substance on the side mirror based on the signal from the one or more sensors;
   retrieve current weather data with the network interface hardware from one or more data servers;
   confirm, based on the current weather data, that the substance is one of fog, frost, or snow;
   automatically activate the side mirror defogger in response to confirmation that the substance is one of fog, frost, or snow; and
   activate the side mirror defogger automatically in response to the confirmation that the substance is one of fog, frost, or snow.

7. The vehicle defogging system of claim 6, wherein the side mirror defogger comprises one or more heating elements positioned and configured to heat the side mirror of the vehicle.

8. The vehicle defogging system of claim 6, further comprising one or more other vehicle defoggers including at least one of a front windshield defogger and a rear windshield defogger, wherein the side mirror defogger, the front windshield defogger, and the rear windshield defogger are each separately operable by the control unit from one another.

9. The vehicle defogging system of claim 6, wherein the control unit is further operable to:
- determine a likelihood of a future accumulation of a substance on a side mirror of a vehicle based on the current weather data; and
- determine a predetermined start time of the vehicle and preemptively activate the side mirror defogger based on the predetermined start time and determination of the likelihood of the accumulation of the substance on the side mirror of the vehicle.

10. The vehicle defogging system of claim 6, wherein the control unit is further operable to
- retrieve one or more future environmental characteristics with the network interface hardware; and
- preemptively activate the side mirror defogger based on the one or more future environmental characteristics.

\* \* \* \* \*

UNITED STATES PATENT AND TRADEMARK OFFICE
CERTIFICATE OF CORRECTION

| | | |
|---|---|---|
| PATENT NO. | : 11,964,633 B2 | Page 1 of 1 |
| APPLICATION NO. | : 16/909421 | |
| DATED | : April 23, 2024 | |
| INVENTOR(S) | : Nathan Wai et al. | |

It is certified that error appears in the above-identified patent and that said Letters Patent is hereby corrected as shown below:

In the Specification

In Column 2, Line(s) 64, after "to allow", delete "to".

In the Claims

In Column 8, Line(s) 33, Claim 3, before "claim 1", insert --of--.

In Column 8, Line(s) 44, Claim 5, before "sensors", insert --more--.

In Column 9, Line(s) 19, Claim 10, after "to", insert --:--.

Signed and Sealed this
Twenty-fifth Day of June, 2024

*Katherine Kelly Vidal*

Katherine Kelly Vidal
*Director of the United States Patent and Trademark Office*